(12) United States Patent
Pickard

(10) Patent No.: US 6,880,879 B2
(45) Date of Patent: Apr. 19, 2005

(54) CAR BOOT LIP PROTECTION COVER

(76) Inventor: Stephen C. Pickard, 29 Coates Street, Morningside, Queensland (AU), 4170

( * ) Notice: Subject to any disclaimer, the term of this patent is extended or adjusted under 35 U.S.C. 154(b) by 16 days.

(21) Appl. No.: 10/398,844

(22) PCT Filed: Nov. 13, 2001

(86) PCT No.: PCT/AU01/01472

§ 371 (c)(1), (2), (4) Date: Apr. 9, 2003

(87) PCT Pub. No.: WO02/40326

PCT Pub. Date: May 23, 2002

(65) Prior Publication Data

US 2004/0164587 A1 Aug. 26, 2004

(30) Foreign Application Priority Data

Nov. 14, 2000 (AU) .............................................. PR1481

(51) Int. Cl.[7] .............................................. B62D 25/06
(52) U.S. Cl. ................................................. 296/136.01
(58) Field of Search .......................... 296/39.1, 136.01, 296/97.23, 37.14; 220/495.01

(56) References Cited

U.S. PATENT DOCUMENTS

| | | | |
|---|---|---|---|
| 3,170,714 A | 2/1965 | Stalker | 280/150 |
| 3,902,752 A | 9/1975 | Pelletier | 296/91 |
| 4,877,281 A * | 10/1989 | Altmann | 296/39.1 |
| 5,129,678 A | 7/1992 | Gurbacki | 280/770 |
| 6,112,360 A | 9/2000 | Kalm et al. | 15/161 |
| 6,131,983 A * | 10/2000 | Jackson | 296/39.1 |
| 6,286,885 B1 * | 9/2001 | Ramos | 296/39.1 |

FOREIGN PATENT DOCUMENTS

| | | |
|---|---|---|
| DE | 1905131 | 8/1970 |
| DE | 1655413 | 6/1971 |
| DE | 29604209 U1 | 8/1996 |
| EP | 0290832 A1 | 11/1988 |

* cited by examiner

Primary Examiner—Lori L. Coletta
(74) Attorney, Agent, or Firm—Sheridan Ross PC

(57) ABSTRACT

Motor vehicle accessory (1) for protecting boot lip (14) and adjacent fender (15) of vehicle from damage comprises sheet (2) of flexible material for positionning inside boot (10) of vehicle. Sheet (2) is moveable between stowed position when received within boot (10) and operative position when extended over boot lip (14) and adjacent fender (15) for protection against dents and scratches when loading or unloading. Accessory (1) includes attachment means on sheet (2) for attachment to floor (12) or sidewalls (13) of boot (10). Sheet (2) comprises tough layer which rests on and protect boot lip (14) and smooth layer overlaying tough layer to assist with sliding of articles across boot lip (14). Typically sheet (2) comprises first (3), second (4) and third (5) panels interconnected by hinge joints.

22 Claims, 6 Drawing Sheets

CAR BOOT LIP PROTECTION COVER

FIELD OF THE INVENTION

This invention relates to a motor vehicle accessory that protects a boot lip and adjacent fender of a motor vehicle, eg. a sedan or a hatch, from damage when goods are loaded into the boot or else unloaded from the boot. It also extends to a motor vehicle incorporating the accessory.

DEFINITIONS

In this specification the term "boot" shall be used interchangeably with the term "trunk". In the USA the term "trunk" is used to describe the motor vehicle component that in Australia is commonly referred to as the boot. This invention applies equally to the trunk lip of a vehicle as that term is understood in the USA.

In this specification the term "fender" shall be used interchangeably with the term "bumper". In the USA the term fender is used to describe the motor vehicle component that in Australia is commonly referred to as the bumper.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

BACKGROUND OF THE INVENTION

Typically sedan vehicles have a rear trunk or boot. Such a boot is used to stow articles of baggage such as bags and suitcases for travel from one location to another. Each time baggage is loaded onto or unloaded from the boot it has to be lifted up over a boot lip formed by a lower edge of a boot opening and an adjacent bumper or fender. These days bumpers or fenders are generally painted the same colour as the motor vehicle and are highly aesthetic features of the vehicle. Any damage to the fender or bumper such as a scratch, dent or the like would detrimentally affect the aesthetics of the vehicle and also the resale value of the vehicle.

Applicant has identified that the fender is extremely prone to damage during loading and unloading of the boot. The damage is usually in the form of scratches or chipped paint.

Clearly it would be advantageous if a means for at least reducing this problem could be devised.

Another problem often encountered with the stowing of baggage or articles in a boot is stabilising or anchoring the position of the article during motor vehicle travel. Articles with smooth bottom surfaces have a tendency to slide around in the boot particularly when the car turns around corners. Clearly it would be advantageous if a simple contrivance could be devised to help overcome this problem.

The current application is focussed on providing at least a partial solution to one or more of these problems.

SUMMARY OF THE INVENTION

According to one aspect of this invention there is provided a motor vehicle accessory comprising:

a sheet of flexible material for positioning inside a boot of a vehicle, the boot having a floor and side walls and a boot lip and an adjacent fender, the sheet being interchangeable between a stowed position in which it is received within the boot and an operative position in which it extends over the boot lip and adjacent fender to protect the boot lip and fender when articles are loaded into or unloaded from the boot.

The accessory may include attachment means mounted on the sheet for attaching the sheet to the floor or sidewalls of the boot.

The sheet may comprise a tough layer which in the operative position rests on the boot lip and adjacent fender, and a smooth layer overlaying the tough layer to assist with the sliding of articles across the boot lip when they are being loaded into or unloaded from the boot.

The tough layer may be made of a thick rubberised material and the smooth layer may comprise any smooth plastics material, eg. a plastics or nylon material.

The tough layer may have a high co-efficient of friction to resist sliding movement thereof across the boot lip. In addition the tough layer may have formations on its surface for enhancing its frictional grip of the surface on which it is resting, eg. dimples, ridges or the like.

The sheet may comprise first and second sheet portions interconnecting with each other along one edge of the second sheet and being pivotal relative to each other, the sheet portions being folded on top of each other in the stowed position and opened up in linearly extending fashion in the operative position.

The sheet may further include a third anchor portion interconnected with the second sheet portion along an edge opposed to said one edge and pivotal relative thereto.

Each of the first and second portions may be in the form of substantially rectangular panels and the first and second panels may be superimposed on each other in the stowed position. Further the third portion may be in the form of a substantially thinner rectangular third panel and the third panel may be positioned adjacent the second panel and beneath the first panel in the stowed position.

The sheet may have lines of decreased thickness between adjacent panels so as to permit pivoting of respectively the first and second panels and the second and third panels relative to each other. Alternatively other means of forming a hinge joint may be used.

The attachment means may include a hook and loop fastener wherein one of the hook and loop parts is mounted on the sheet and the other of the hook and loop parts is mounted on a floor surface of the boot. Conveniently the hook part may be on the attachment means and the loop part may be formed by the carpet typically found on the floor of the boot.

The accessory may further include means to assist its manual interchange between the stowed and operative positions.

The interchange means may comprise a handle formation on the first panel that is remote from the anchor panel, eg. in the form of a finger opening or a stiffening rib extending along the free end of the first panel.

According to another aspect of this invention there is provided a motor vehicle accessory comprising:

a sheet of flexible material for positioning inside a boot of a vehicle, the boot having a floor and side walls and a boot lip and adjacent fender, the sheet being interchangeable between an internal operative position in which it extends across the floor of the boot and an external operative position in which it extends over the boot lip and adjacent fender to protect the boot lip when articles are loaded into or unloaded from the boot.

Thus the sheet may be flipped between an internal operative position for anchoring or stabilising an article and an external operative position for shielding the boot lip and fender without necessarily having an intermediate stowed position that the previous aspect of the invention had.

The sheet may comprise a tough layer having a high coefficient of friction and a smooth layer in superimposed relationship with the tough layer, and the tough layer may overlay the smooth layer and face upwardly in the internal operative position, and the smooth layer may overlay the tough layer and face upwardly in the external operative position.

The accessory may further include attachment means for attaching the sheet to the floor or walls of the boot, eg. as described above for the first aspect of the invention.

The sheet may be interchangeable between said internal and external operative positions and also an internal stowed position within the boot.

According to a third aspect of this invention there is provided a motor vehicle accessory comprising:

a sheet of flexible material for positioning inside a boot of a vehicle, the boot having a floor and side walls and a boot lip and an adjacent fender, wherein said sheet is interchangeable between a stowed position in which it is received in the boot and an operative position in which it is received within the boot and extends across the floor of the boot to assist in stabilising the position of articles being stowed within the boot.

Conveniently the sheet may comprise a tough layer having a high coefficient of friction facing upwardly in the operative position to assist in stabilising the position of an article placed on the sheet.

The sheet may be further interchangeable between said stowed and operative positions within the boot, and also a further operative position in which it extends across the boot lip and fender outside the boot.

The accessory may further include a smooth layer in superimposed relationship with the tough layer with the smooth layer facing upwardly in said further operative position.

According to another aspect of the invention there is provided a motor vehicle comprising:

a car body having a boot having a floor and side walls and a boot lip and a rear fender adjacent the boot lip; and means for protecting the rear fender against damage when articles are loaded into the boot or removed from the boot.

The protecting means may comprise a sheet of flexible material moveable between a stowed position within the boot and an operative position in which it extends across the boot lip and rear fender to protect the boot lip and fender when articles are loaded into or unloaded from the boot. The sheet may include any one or more of the preferred features described above with reference to the previous aspects of the invention.

The vehicle may further include means for stabilising the position of an article within the boot during travel of the vehicle, eg in the form of a sheet of flexible material arranged on the boot floor.

According to yet another aspect of this invention there is provided a motor vehicle comprising:

a car body having a boot having a floor and side walls and a boot lip and a rear fender adjacent the boot lip; and an accessory as defined in any one of the first to third aspects of the invention described above.

A motor vehicle accessory m accordance with the invention may manifest itself in a variety of forms. It will be convenient to hereinafter describe in detail at least two embodiments of the invention with reference to the accompanying drawings. The purpose of providing the detailed description is to instruct persons having an interest in the subject matter of the invention how to carry the invention into practical effect. It is to be clearly understood however that the specific nature of this detailed description does not supersede the generality of the preceding broad description.

DETAILED DESCRIPTION OF THE INVENTION

Figure 1:
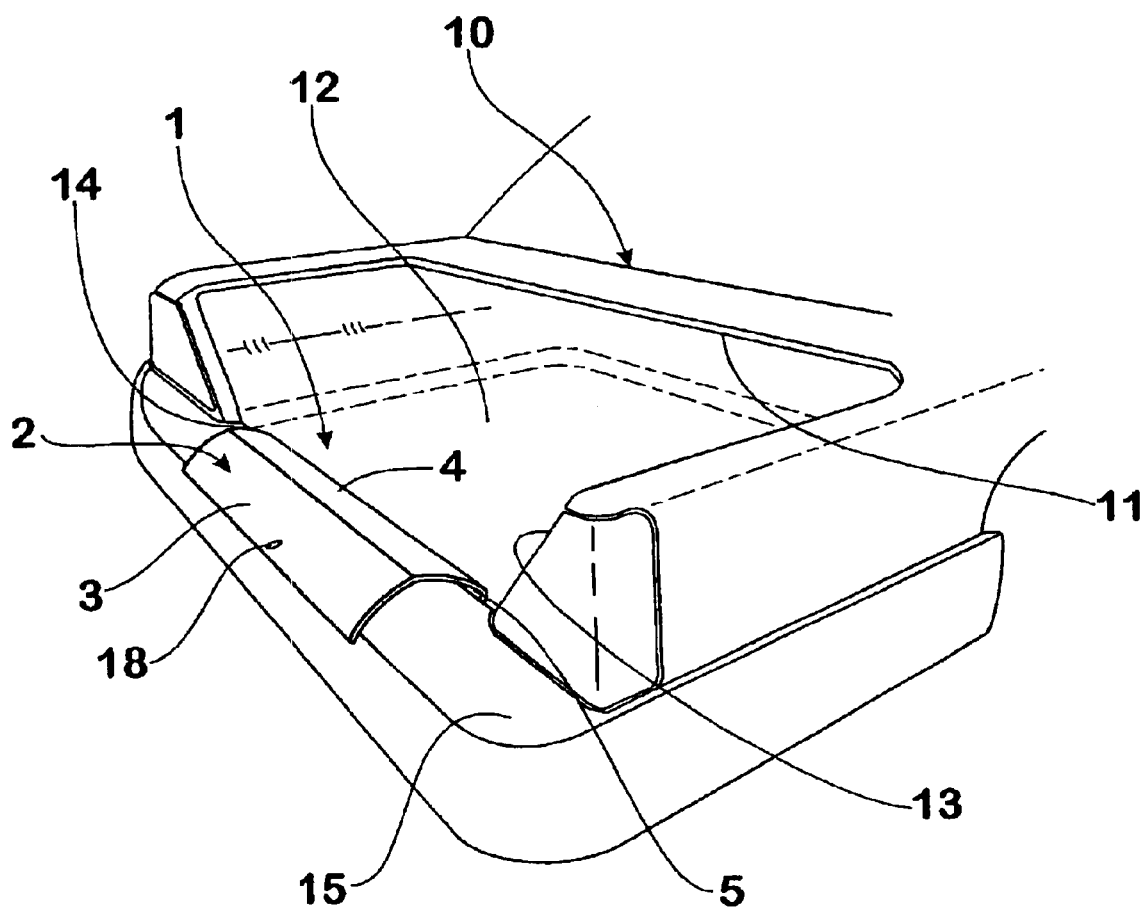
FIG. 1 is a three dimensional view of a vehicle accessory in use on a car.
Figure 2:
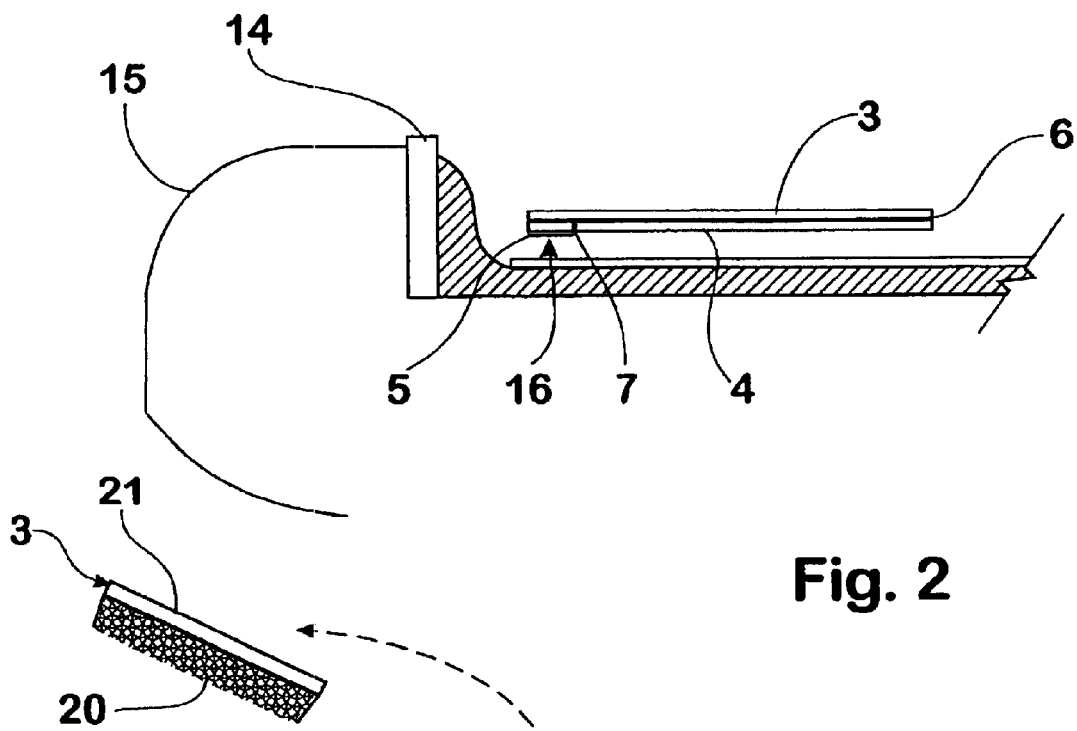
FIG. 2 is a sectional side view of the vehicle accessory of FIG. 1 in a stowed position.

In FIGS. 1 to 7 reference numeral 1 refers generally to a motor vehicle accessory in accordance with the invention.

The accessory 1 comprises broadly a sheet 2 having first and second portions 3 and 4 which serve a protective function and a thinner third portion 5 which serves an anchoring function. The accessory 1 is movable between a stowed inoperative position shown in FIGS. 2 and 4 an intermediate position shown in FIGS. 3 and 5, and an operative position shown in FIG. 6.

Each of the portions 3, 4 is formed by a panel of said sheet material having a broadly rectangular configuration. The panels 3, 4 are interconnected along one side thereof by means of a hinged joint 6. The portion 5is also a panel of rectangular sheet material. The panel 5 is attached to the panel 4 along a side thereof that is opposed to its attachment to the panel 3 by means of a hinged joint 7. The panel 5 is much thinner than the other panels 3 and 4.

A vehicle on which accessory 1 is mounted, and particularly the boot or trunk area thereof, is indicated generally by reference 10. It comprises vehicle body structure 11 defining a floor 12 and side walls 13 and a boot lip 14. A bumper or fender 15 projects rearwardly from the structure 11 below the boot lip 14. The bumper or fender 15 is typically painted the same colour as the vehicle 10.

Figure 3:
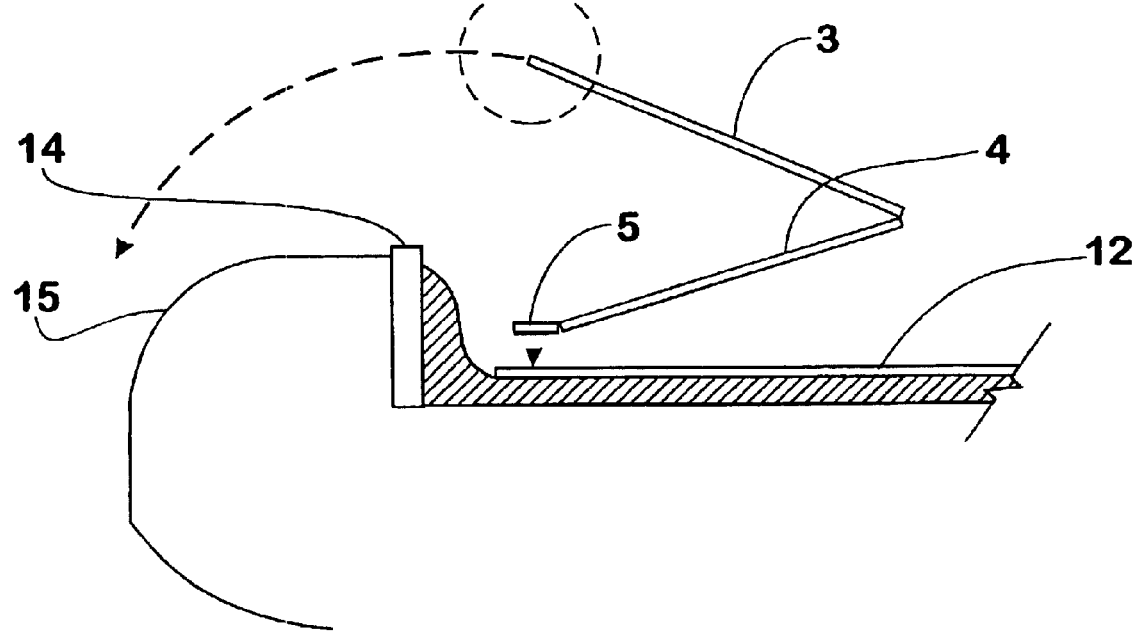
FIG. 3 is a sectional side view of the accessory intermediate stowed and operative positions and showing some detail of the components of the sheet.
Figure 4:
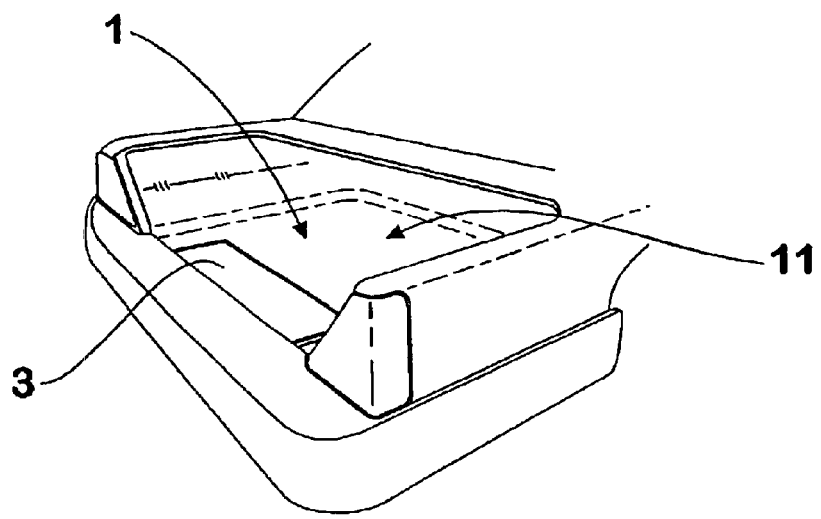
FIGS. 4–6 are three dimensional views of the accessory being moved from the stowed to the operative positions.
Figure 5:
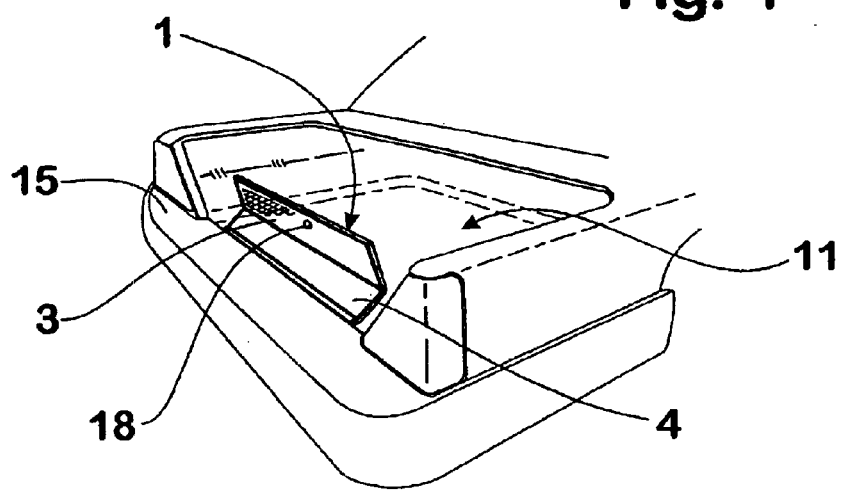
Figure 6:
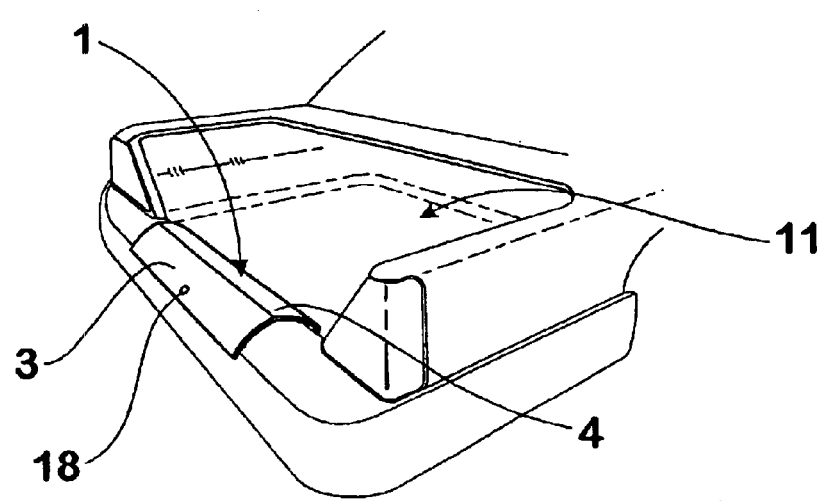

As shown in FIG. 3 the lower layer 20 of the sheet is made of a tough resilient rubberised material of a thickness of about 6–10 mm. This provides the ability to absorb an impact from articles without damaging the fender 15. In addition the underside of the layer 20 has a texture that enhances its ability to grip the surface of the fender 15 when it is placed across it.

The upper layer 21 has a smooth finish to enable articles to be easily slid thereacross. Typically this might be formed by a synthetic plastics type material, eg. polyethylene or nylon. However it will be appreciated that many other materials could be used.

The hinged joints 6 and 7 between respectively panels 3 and 4 and panels 4 and 5 may be formed by a zone of reduced thickness, particularly of the rubberised layer 20, at the point of interconnection of the panel. It is important that the hinged joints 6, 7 can easily bend up to 180°.

The panel 5 is releasably attached to the boot structure 11 and particularly the floor 12 of the boot by means of a hook and loop fastener, eg VELCRO type attachment 16. Hooks on the panel 5 attach readily to loops on the floor of the boot, eg. provided by the usual carpet lining of the floor of the boot. The fastener might comprise patches positioned at spaced intervals along the length of the panel 5.

The accessory 1 also includes a handle in a form of a finger grip 18 on the panel 3.

In use, when articles need to be stowed in a boot or trunk 10 or removed from a boot or trunk 10, the accessory 1 is moved, eg manually by a user, from the inoperative to the operative positions. This is accomplished by simply lifting the sheet 2 and placing it over the fender 15 in the manner shown in FIGS. 4 to 6. This places the rubber layer 20 adjacent to fender 15 with the smooth upper layer 21 over which articles can be slid facing upwardly. This movement is simple and will literally take a couple of seconds to effect.

Articles can then be lifted out of the boot 10. If, as often happens, they bump the fender 15, the accessory 1 protects the fender 15 against dents and paint damage. In some instances it may be convenient to simply lift heavy objects onto the accessory 1 and then slide them over the layer 21 of the panels 3 and 4. That is no attempt is made to lift them over the fender 15 and they are simply slid across the sheet 2. This could considerably reduce the strain on a user's back when lifting articles out of a car boot.

After use the accessory 1 is moved quickly and simply back to the stored inoperative position by folding the panel 3 on top of the panels 4 and 5 which are side by side. Again this can be accomplished simply and effectively. If goods interfere with the return of the sheet to the stowed position the sheet can simply be folded up against the side of the goods or rested on the top of the goods. When the goods are removed from the boot the sheet can then be returned to the original stowed position.

Figure 7:
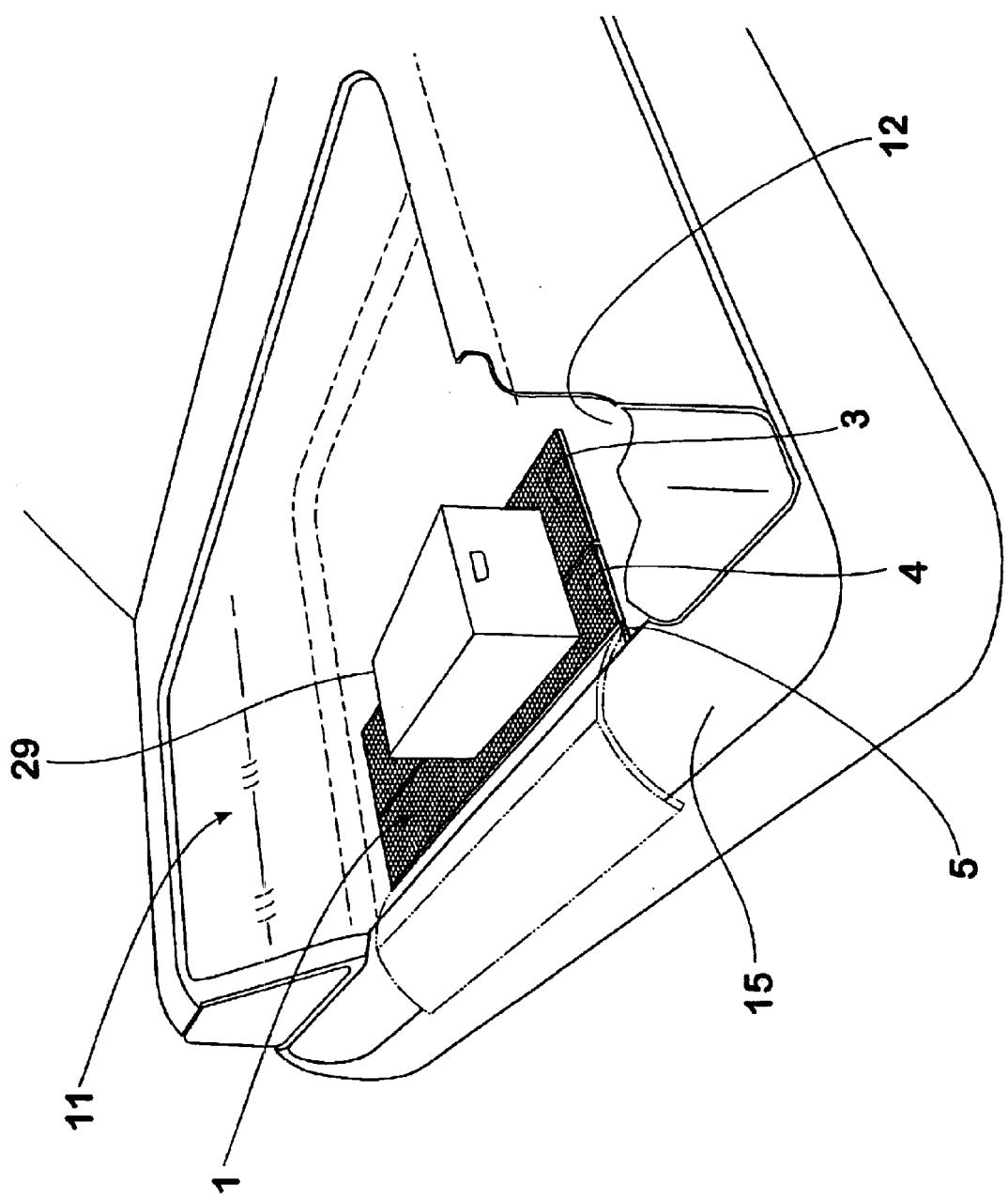
FIG. 7 is a three dimensional view of the accessory of FIG. 1 in a further operative position.

As illustrated in FIG. 7, the accessory 1 can also be used to stabilise objects being stowed in a car boot during a journey. To do this the portions 3 and 4 are folded out in a direction inwardly into the boot. This places the layer 20 with a frictional gripping surface facing upwardly and the smooth layer 21 facing downwardly against the floor 12 of the boot 11. That is the orientation of the accessory 1 is inverted compared to that when it is used to straddle the fender 15. An article, eg an ESKY, box or container 29, can then be placed on the accessory and the grip afforded by the layer 20 will resist movement of the article around the boot 11 during travel. Thus it effectively assists in anchoring the article.

Figure 8:
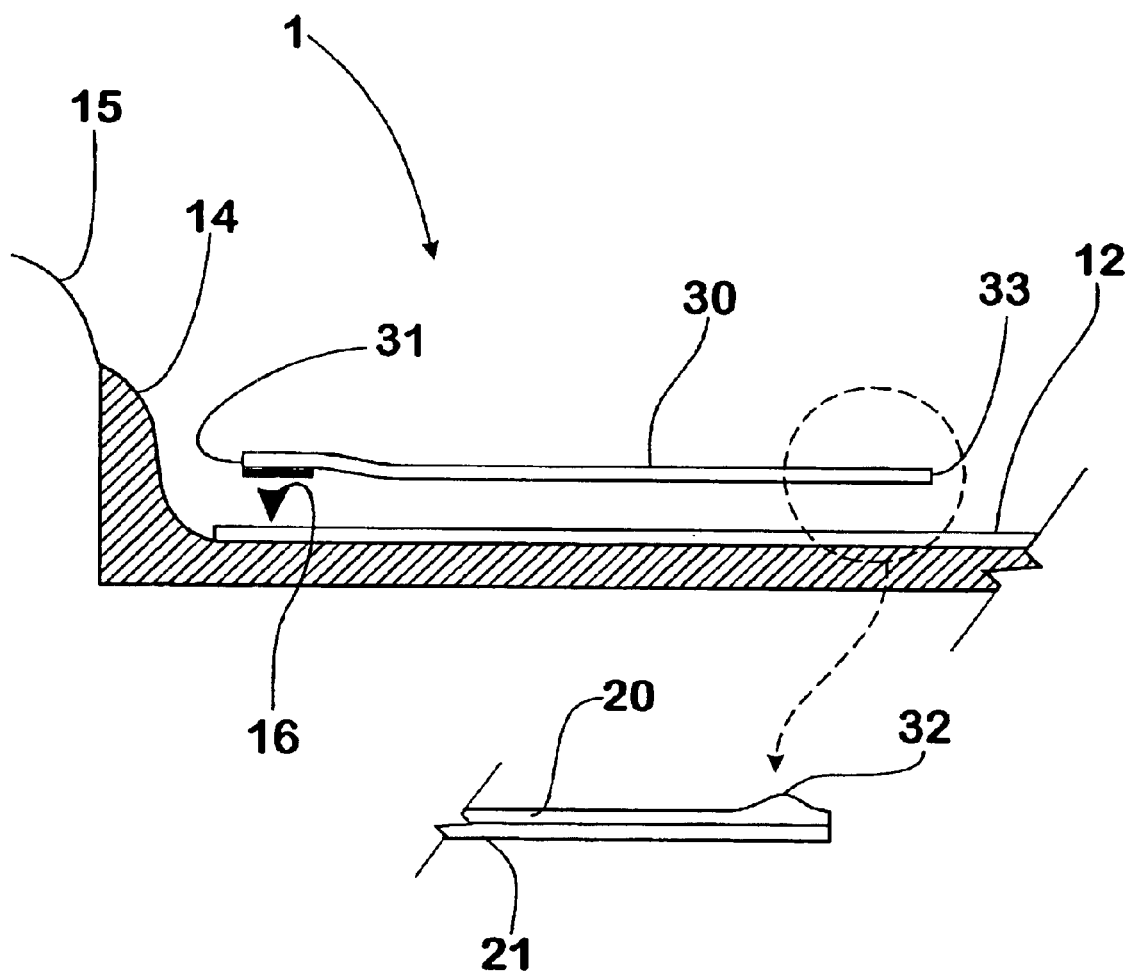
FIG. 8 is a sectional side view of an accessory in accordance with a second embodiment of the invention.
Figure 9:
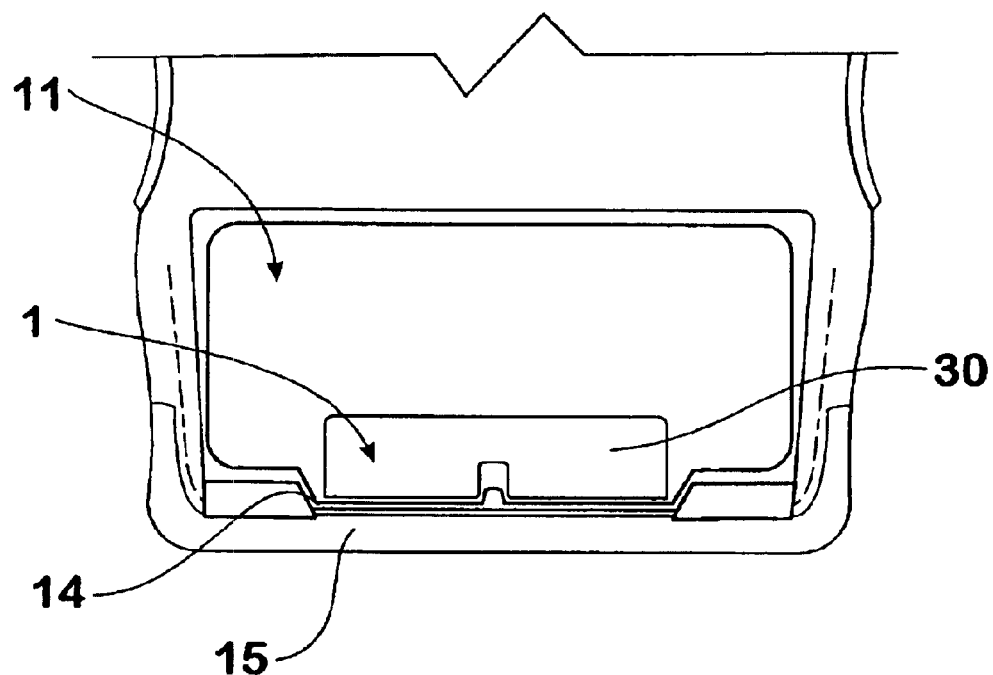
FIG. 9 is a top plan view of the accessory of FIG. 7 in a stowed inoperative position.
Figure 10:
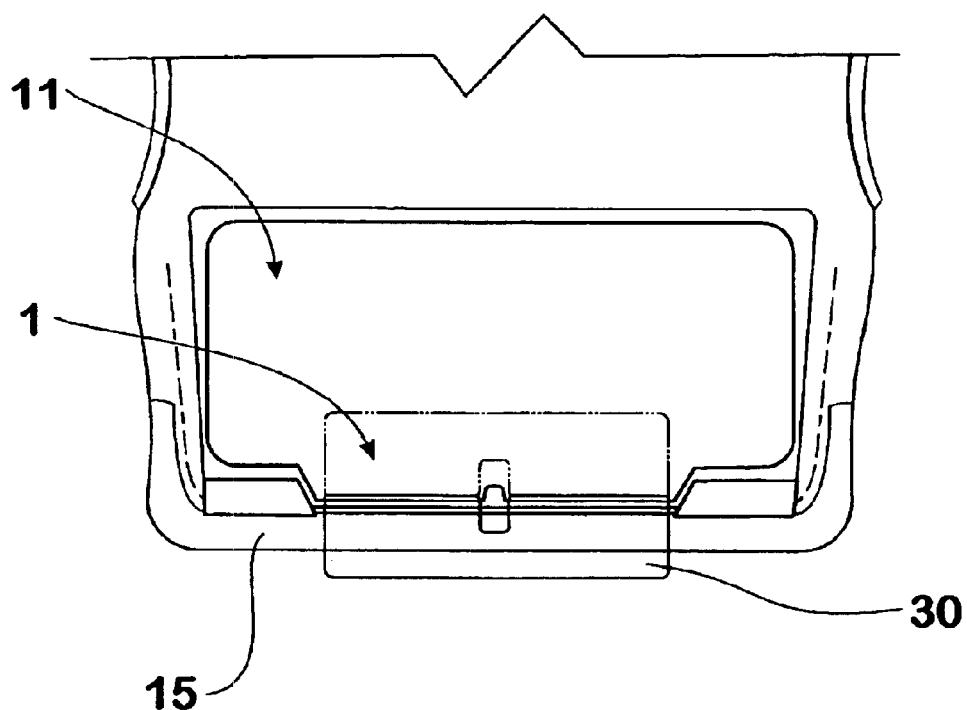
FIG. 10 is a top plan view of the accessory of FIG. 7 in an operative position.

FIGS. 8 to 10 illustrate an accessory in accordance with a second embodiment of the invention.

This embodiment has similarities with the embodiment described above with reference to FIGS. 1 to 7. Accordingly unless otherwise indicated the same reference numerals will be used to the same components.

As shown in FIG. 8, the accessory 1 comprises a rectangular sheet having only one panel 30 rather than the three panels 3, 4, 5 of the first embodiment.

The panel 30 is broadly rectangular and is attached to the floor of the boot along the edge adjacent the boot opening. This may be accomplished by an attachment strip that is a hook and loop fastener extending along one edge 31 of the panel 30.

A handle formation in the form of a flipping rib 32 may run along the opposite edge 33 of the panel 30 to assist in manually moving the panel 30 from the stowed to the operative positions and back again.

FIG. 9 shows the accessory in the stowed position and FIG. 10 shows the accessory in the operative position. In the stowed position the panel 30 lies on the floor of the boot. To move the accessory to the operative position it is simply a case of flipping the panel 30 through 180°. The panel 30 is capable of pivoting about a point adjacent to the attachment strip.

An advantage of the accessory described above is that it is relatively simple and easy to use. It also performs two important functions, namely protecting the fender against damage when loading/unloading articles from the boot and also providing a stable anchoring means for assisting in stabilising articles in the boot during travel. Further the accessory can easily be fitted to the overwhelming majority of existing motor vehicles without any modification being required. In addition one size of the accessory would fit most vehicles.

It will of course be realised that the above has been given only by way of illustrative example of the invention and that all modifications and variations thereto that would be apparent to person skilled in the art are deemed to fall within the broad scope and ambit to the invention herein set forth.

What is claimed is:

1. A motor vehicle accessory comprising: a sheet of flexible material for positioning inside a boot of a vehicle, the boot having a floor and side walls and a boot lip and adjacent fender, wherein the sheet comprises a layer of tough material having a high coefficient of friction and a layer of smooth material overlaying the layer of tough material, and the sheet is interchangeable between a stowed position in which it is received within the boot and an external operative position in which the layer of tough material extends over the boot lip and adjacent fender to protect the boot lip and adjacent fender when articles are loaded into or unloaded from the boot and also resist sliding movement of the sheet there across the boot lip, and the layer of smooth material forms a surface over which articles can be slid when they are loaded into or unloaded from the boot.

2. A motor vehicle accessory according to claim 1, wherein the sheet is further interchangeable between said stowed and external operative positions and an internal operative position in which it extends across the floor of the boot with said layer of tough material having a high coefficient of friction facing upwardly for frictionally gripping an article that is placed on the sheet and the layer of smooth material faces downwardly in contact with the floor of the boot.

3. A motor vehicle accessory according to claim 1, wherein the layer of tough material comprises a thick layer of rubberised material.

4. A motor vehicle accessory according to claim 3, wherein the layer of tough material has friction grip formations on its surface for enhancing its frictional grip of the surface on which it is resting.

5. A motor vehicle accessory according to claim 1, including attachment means mounted on the sheet for attaching the sheet to the floor or side walls of the boot.

6. A motor vehicle accessory according to claim 5, wherein the attachment means includes a hook and loop fastener and wherein one of the hook and loop parts is mounted on the sheet and the other of the hook and loop parts is mounted on the floor of the boot.

7. A motor vehicle accessory according to claim 1, wherein the sheet comprises a plurality of sheet portions, and wherein the sheet portions are folded upon themselves in the stowed position with the layer of tough material facing inwardly and the layer of smooth material facing outwardly forming the external surfaces of the folded sheet.

8. A motor vehicle accessory according to claim 7, wherein the sheet comprises first and second said sheet portions interconnecting each other along one edge of each of the first and second sheet portions and being pivotal relative to each other, the sheet portions being folded on top of each other in the stowed position and opened up to extend substantially linearly in the operative position.

9. A motor vehicle accessory according to claim 8, wherein the sheet further includes a third anchor portion interconnected with the second sheet portion along an edge opposed to said one edge and pivotal relative thereto.

10. A motor vehicle accessory according to claim 9, wherein each of the first and second portions are in the form of substantially rectangular panels with the first panel disposed above the second panel in the stowed position, and the third portion is in the form of a substantially thinner rectangular panel, with the third panel being positioned adjacent the second panel and beneath the first panel in the stowed position.

11. A motor vehicle accessory according to claim 9, wherein the sheet has lines of decreased thickness between adjacent panels so as to permit the pivoting of respectively the first and second panels and the second and third panels relative to each other.

12. A motor vehicle accessory according to claim 11, wherein the accessory further includes a handle formation on the first panel that is remote from the anchor panel to assist with its manual interchange between said stowed and external operative positions.

13. A motor vehicle accessory comprising:
a sheet of flexible material for positioning inside a boot of a vehicle comprising a layer of tough material having a high coefficient of friction and a layer of smooth material in superimposed relationship with the layer of tough material, the boot having a floor and side walls and a boot lip and adjacent fender, wherein the sheet is interchangeable between an internal operative position in which it extends across the floor of the boot with the layer of tough material facing upwardly to frictionally grip an article placed thereon and the layer of smooth material faces downwardly in contact with the floor, and an external operative position in which the layer of tough material extends over the boot lip and adjacent fender to protect the boot lip and fender when articles are loaded into or unloaded from the boot and resist sliding of the sheet across the boot lip and the layer of smooth material forms a surface over which articles can be slid when loading/unloading articles into and out of the boot.

14. A motor vehicle accessory according to claim 13, wherein the sheet is interchangeable between said internal and external operative positions and also an internal stowed position within the boot.

15. A motor vehicle accessory according to claim 14, wherein the sheet comprises a plurality of portions, and wherein said plurality of portions are folded on top of each other in the internal stowed position with the layer of tough material facing inwardly and the layer of smooth material facing outwardly forming the externally facing surface of the folded sheet.

16. A motor vehicle accessory according to claim 13, further including attachment means mounted on the sheet for attaching the sheet to the floor or walls of the boot.

17. A motor vehicle accessory comprising:
a sheet of flexible material for positioning inside a boot of a vehicle comprising a layer of tough material with a high coefficient of friction and a layer of smooth material overlaying the layer of tough material, the boat having a floor and side walls and a boot lip and an adjacent fender, wherein said sheet is interchangeable between a stowed position in which it is received in the boot and an internal operative position in which it is received within the boot and extends across the floor of the boot with said layer of tough material facing upwardly to assist in stabilising the position of an article stowed within the boot and the layer of smooth material faces downwardly in contact with the floor of the boot.

18. A motor vehicle accessory according to claim 17, wherein the sheet comprises a plurality of portions, and wherein said plurality of portions are folded on top of each other in the stowed position with the layer of tough material facing inwardly and the layer of smooth material facing outwardly forming the external surfaces of the folded sheet.

19. A motor vehicle accessory according to claim 17, wherein the sheet is interchangeable between said stowed and operative positions within the boot, and also an external operative position in which it extends across the boot lip with the layer of tough material facing downwardly protecting the lip and adjacent fender and the layer of smooth material faces upwardly forming a surface over which articles can be slid.

20. A motor vehicle accessory according to claim 17 further including attachment means mounted on the sheet for attaching the sheet to the floor or walls of the boot.

21. A motor vehicle comprising:
a car body having a boot having a floor and side walls and a boot lip and rear fender adjacent the boot lip; and
a sheet of flexible material comprising a layer of tough material having a high coefficient of friction and a layer of smooth material overlaying the layer of tough material, wherein the sheet of material can be arranged in an external operative position with said layer of tough material resting on the boot lip to protect the boot lip and adjacent fender and also resist sliding movement of the sheet across the boot lip, and the layer of smooth material faces upwardly forming a surface across which articles can be slid.

22. A motor vehicle according to claim 21, wherein said sheet of flexible material can also be arranged in an internal operative position on the boot floor with said layer of smooth material facing downwardly and said layer of tough material facing upwardly whereby to stabilise an article placed on the sheet of material during travel of the vehicle.

* * * * *